USO10268694B2

United States Patent
Kirsch et al.

(10) Patent No.: US 10,268,694 B2
(45) Date of Patent: Apr. 23, 2019

(54) DECOUPLING OF ARCHIVING AND DESTRUCTION FOR DEPENDENT BUSINESS OBJECTS

(71) Applicant: SAP SE, Walldorf (DE)

(72) Inventors: Wolfgang Gerald Kirsch, Heidelberg (DE); Christian Ralf Robert Becker, Karlsruhe (DE); Thomas Graeser, Bammental (DE)

(73) Assignee: SAP SE, Walldorf (DE)

( * ) Notice: Subject to any disclaimer, the term of this patent is extended or adjusted under 35 U.S.C. 154(b) by 636 days.

(21) Appl. No.: 14/973,750

(22) Filed: Dec. 18, 2015

(65) Prior Publication Data

US 2017/0177595 A1 Jun. 22, 2017

(51) Int. Cl.
| | |
|---|---|
| *G06F 7/00* | (2006.01) |
| *G06F 17/00* | (2006.01) |
| *G06F 17/30* | (2006.01) |
| *G06F 11/14* | (2006.01) |
| *G06Q 40/00* | (2012.01) |

(52) U.S. Cl.
CPC .... *G06F 17/30085* (2013.01); *G06F 11/1474* (2013.01); *G06F 17/30073* (2013.01); *G06F 17/30371* (2013.01); *G06Q 40/12* (2013.12); *G06F 2201/87* (2013.01)

(58) Field of Classification Search
CPC ......... G06F 17/30085; G06F 17/30073; G06F 17/30371; G06F 11/1474; G06F 2201/87; G06Q 40/12
See application file for complete search history.

(56) References Cited

U.S. PATENT DOCUMENTS

| | | | | |
|---|---|---|---|---|
| 7,653,663 | B1 * | 1/2010 | Wright | G06F 11/1448 707/999.2 |
| 2006/0074593 | A1 * | 4/2006 | Muraoka | G06F 11/3476 702/182 |
| 2012/0047112 | A1 * | 2/2012 | Steffan | G06F 17/30011 707/662 |

\* cited by examiner

*Primary Examiner* — Azam M Cheema
(74) *Attorney, Agent, or Firm* — Klarquist Sparkman, LLP

(57) ABSTRACT

A framework for an improved destruction of interrelated data objects is described herein. In one embodiment, destruction and/or archiving of data objects are decoupled from the destruction and/or archiving of a master data object by using a backup table. Before being destructed, attributes relevant to destruction of dependent data objects are copied from the master data object to the backup table. Subsequent destruction operations performed on data objects dependent on the master data object may attempt to retrieve the attributes relevant to destruction from the master data object itself, or from the backup table. In this way, data object destruction orderings are avoided, enabling dependent data objects to be destructed at any time.

16 Claims, 4 Drawing Sheets

DECOUPLING OF ARCHIVING AND DESTRUCTION FOR DEPENDENT BUSINESS OBJECTS

BACKGROUND

Modern computing systems create tremendous amounts of data of varying sensitivities. One operative question is when data should be destructed and/or archived (hereinafter, 'destructed' is taken to mean 'destructed and/or archived'). Data may be destructed for many reasons, including reducing data storage costs, improving data access performance, business requirements, government regulations, and the like. For example, person-related data may be subject to data privacy regulations which require the person-related data to be destructed when no longer needed by the system.

However, the need to destruct data is balanced against other legal obligations, which often require data to be preserved for certain periods of time. Other requirements, such as data revision, must also be considered when determining when to destruct data. Typically, individual data objects are destructed as a whole.

Data is often stored in hierarchies and/or interconnected graphs of data objects. Whether defined by in-memory references, database foreign key relationships, graph database edges and vertices, or the like, a given data object often holds a reference to another data object. To take one example, business objects typically exist as one of a hierarchy of business objects. A business object is defined as a larger set of data which exists in a system for the purpose of combined handling for the set of data with regard to its contained information, its lifecycle, or its consistent behavior in a process. In one embodiment, the factors that determine when a data object is to be destructed (i.e., retention time rules for destruction and residence time rules for archiving) are common to related data objects. Often, these factors are stored in a single location, such as an attribute of a master data object.

However, as these destruction factors must be available during the destruction of all dependent data objects, a limitation is placed on the sequence of object destruction. Specifically, the master data object must be preserved until all dependent objects have been destructed. This limitation negatively impacts object destruction throughput, and may itself prevent compliance with applicable object destruction regulations and/or business requirements by extending retention of the master data object.

Therefore, there is a need for an improved framework that addresses the abovementioned challenges.

SUMMARY

A framework for the improved destruction of interrelated data objects is described herein. In one embodiment, destruction and/or archiving of data objects is decoupled from the destruction and/or archiving of a master data object. In one embodiment, the master data object is enabled to be destroyed before or concurrent with the destruction of dependent data objects.

In one embodiment, a backup table is used to decouple data object destruction, the backup table storing attributes of the master data object relevant for destruction of any dependent data objects. Once all of the dependent data objects have been destructed, the corresponding entry may be deleted from the backup table.

In one embodiment, entries in the backup table are referenced with a reference key (e.g., primary key) that is also the reference key of the master data object itself. In scenarios where legal regulations compel the timely deletion of sensitive data, storing sensitive data in the backup table is avoided. The entry in the backup table may be created before or concurrent with the destruction of the master data object. Subsequently, in the course of destructing a dependent data object, a destruction/archiving component will attempt to retrieve relevant attributes from the master data object. However, if the master data object has been destructed, the relevant attributes are retrieved from the backup table. Once all data objects that depend on the master data object have been destructed, the entry in the backup table may be deleted.

In one embodiment, a data recreation component recreates an entry in the backup table based on an archived master data object. In this way, archived data objects dependent on the archived master data object may be reprocessed, for example, to re-evaluate for destruction based on updated retention time rules.

By alleviating fixed order destruction requirements, the embodiments simplify handling of archiving. Dependency matrices and hierarchies of data objects can be avoided, and destruction can be performed based on current workload. The benefits are magnified when all master data objects utilize a backup table, as data objects that are dependent on more than one master data object can be destructed at any time.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

Figure 1:
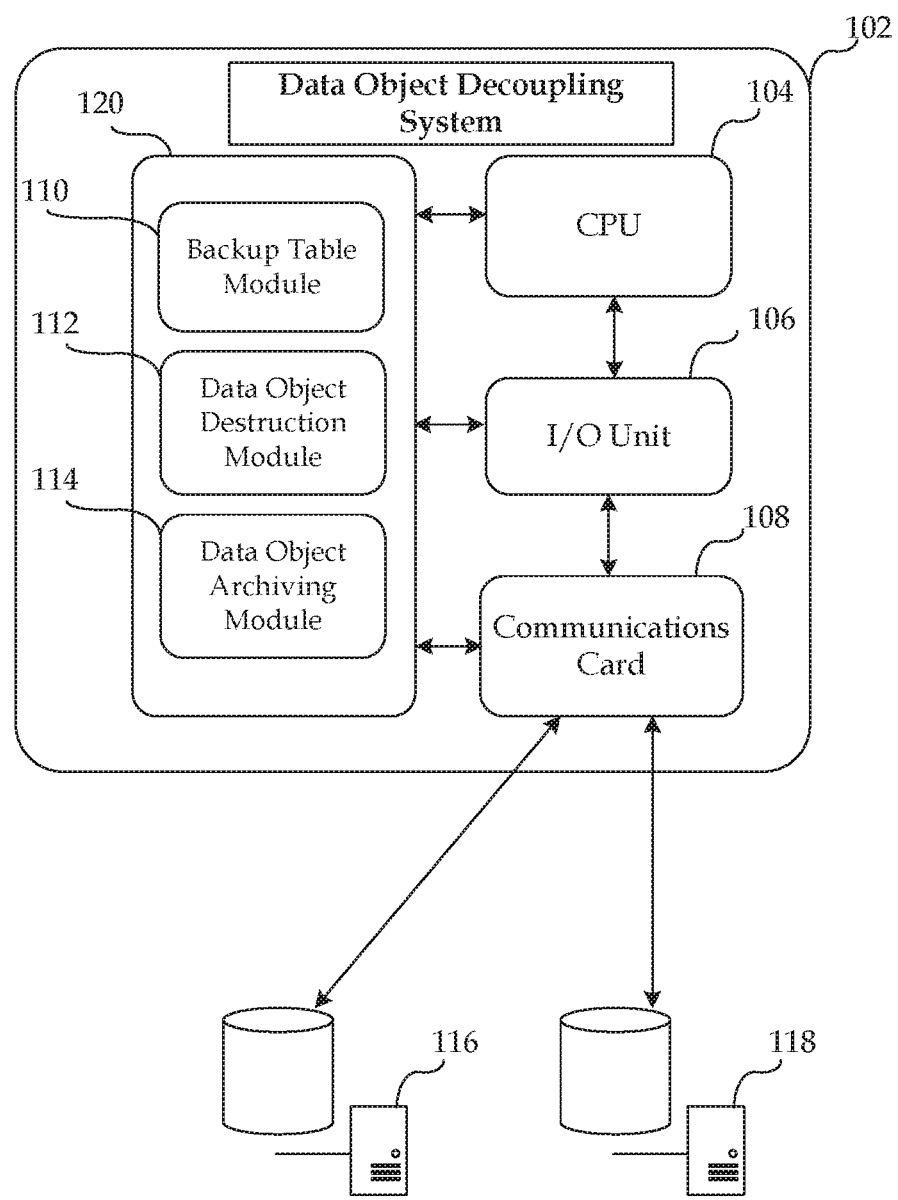
FIG. 1 is a block diagram illustrating an exemplary architecture.

FIG. 1 is a block diagram illustrating an exemplary architecture 100 that may be used to implement the data object destruction and/or archival system described herein.

Generally, architecture 100 may include a data object decoupling system 102, a data repository 116, and an archival storage 118. It should be appreciated that the present framework is described in the context of a contract, such as a bank account, as a master data object and individual payments on/from the bank account as dependent data objects, with a relational data store backing active data and archival storage, for purposes of illustration only. The present framework may also be applied to any other type of master data object or dependent data object, such as scientific data objects, photography data objects, or the like. Similarly, any other type of data store, including in-memory object based storage, graph database, NoSql, or the like, are also contemplated.

The data object decoupling system 102 can be any type of computing device capable of responding to and executing instructions in a defined manner, such as a workstation, a server, a portable laptop computer, another portable device, a touch-based tablet, a smart phone, a mini-computer, a mainframe computer, a storage system, a dedicated digital appliance, a device, a component, other equipment, or a combination of these. The system may include a central processing unit (CPU) 104, an input/output (I/O) unit 106, a memory module 120 and a communications card or device 108 (e.g., modem and/or network adapter) for exchanging data with a network (e.g., local area network (LAN) or a wide area network (WAN)). It should be appreciated that the different components and sub-components of the system may be located on different machines or systems. Memory module 120 may include a backup table module 110, a data object destruction module 112, and a data object archiving module 114. In one embodiment, data object destruction module 112 and data object archiving module 114 are implemented in the same software component, i.e., archiving/destruction (AD) module 302, as described in FIG. 3.

The data object decoupling system 102 may be communicatively coupled to one or more other computer systems or devices via the network. For instance, the system may further be communicatively coupled to one or more data repository 116 and archival storage 118. Data repository 116 and archival storage 118 may be, for example, any database (e.g., relational database, in-memory database, etc.), an entity (e.g., set of related records), or a data set included in the database. In some implementations, the database server stores data objects, including master data objects and dependent data objects, in addition to backup tables.

Backup table module 110 includes a logic for copying one or more attributes from a master data object into a backup table. In one embodiment, the attributes that are copied are relevant to a retention time calculation for determining when one or more dependent data objects are to be destroyed. For example, if the master data object represents a bank account contract, and dependent data object represents a payment on the bank account, the jurisdiction in which the bank account was opened determines what data privacy regulations apply to the payments. In this example, attributes to be copied may include geographical data, such as city, state, and country. Additionally or alternatively, attributes to be copied may include a choice of law clause indicating which laws apply to the master data object and dependent data objects.

In one embodiment, attributes relevant to a residence time calculation for determining when to archive a data object are also copied to the backup table. If the backup table does not exist, backup table module 110 will create a first backup table.

Data object destruction module 112 includes a logic for destructing data objects. In one embodiment, data object destruction includes a physical deletion of an item, although soft deletes, asynchronous deletes, or any other delete operation is similarly contemplated. Data object destruction module 112 may destruct any type of data object, including master data objects and dependent data objects.

Data object archiving module 114 includes a logic for archiving data objects. In one embodiment, data objects are archived by copying them to a computing device designed for long term storage, such as archival storage 118. Typically, before an archived data object can be acted upon again, it must first be retrieved from the archival system. In one embodiment, the reference identifier (Id), e.g., a primary key, used to identify a data object at run-time is also used to identify a data object that has been archived. In one embodiment, a globally unique identifier (GUID) may be used as a reference identifier.

Figure 2:
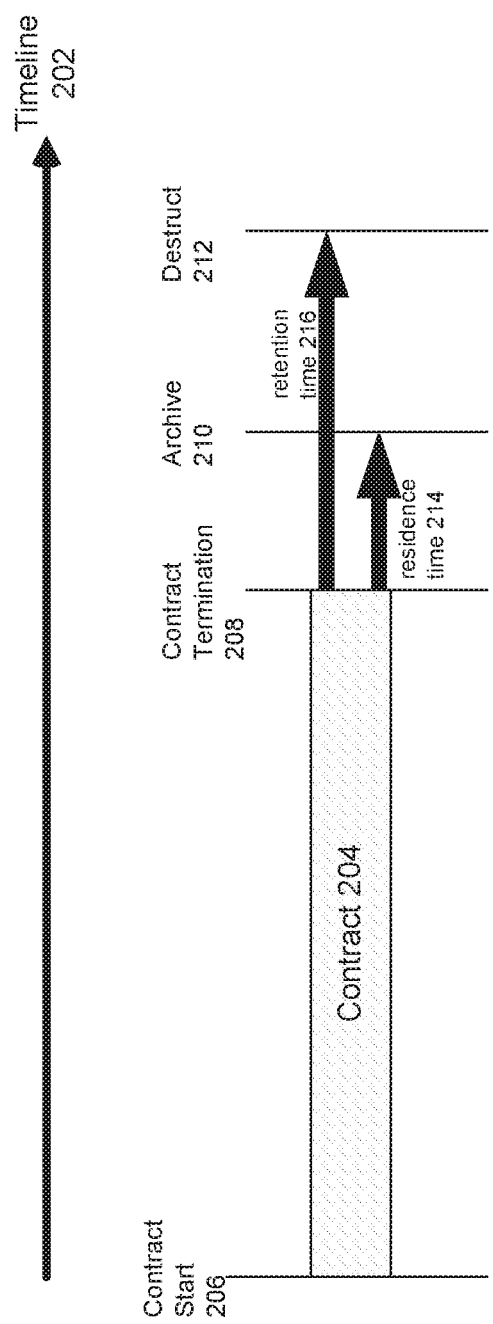
FIG. 2 is a timeline depicting an exemplary embodiment of decoupled data object archiving and/or destruction.

FIG. 2 is a timeline depicting an exemplary embodiment 200 of decoupled data object archiving and/or destruction. While FIG. 2 depicts a timeline of a business object (in this case a business object representing a contract), one of ordinary skill will appreciate that the same methods and systems will apply to any other type of business object or other type of data object.

Timeline 202 depicts the passage of time, from left to right. Contract 204 depicts a business object that is in effect from contract start 206 to contract termination 208. Contract start 206 marks when the business object comes into existence. Contract termination 208 may occur when a business deal has been resolved, a bank account closed, or some other event has occurred. Contract termination 208 is also known as end of business (EoB). Storage of data, particularly sensitive, personal data, is often subject to regulation, business decisions, or other constraints once EoB has been reached.

Archive 210 indicates that a business object is archived after residence time 214 has elapsed past contract termination 208. Archiving may be performed in response to a high data volume, in an attempt to reduce memory pressure. In one embodiment, a data object is archived by copying it to archival storage 118.

Destruct 212 indicates that a business object is deleted from the underlying data store (i.e., data repository 116 and/or archival storage 118). In one embodiment, destruct 212 occurs after retention time 216 has elapsed. Contract 204 may be destructed from data repository 116, from memory 120, or from archival storage 118.

Figure 3:
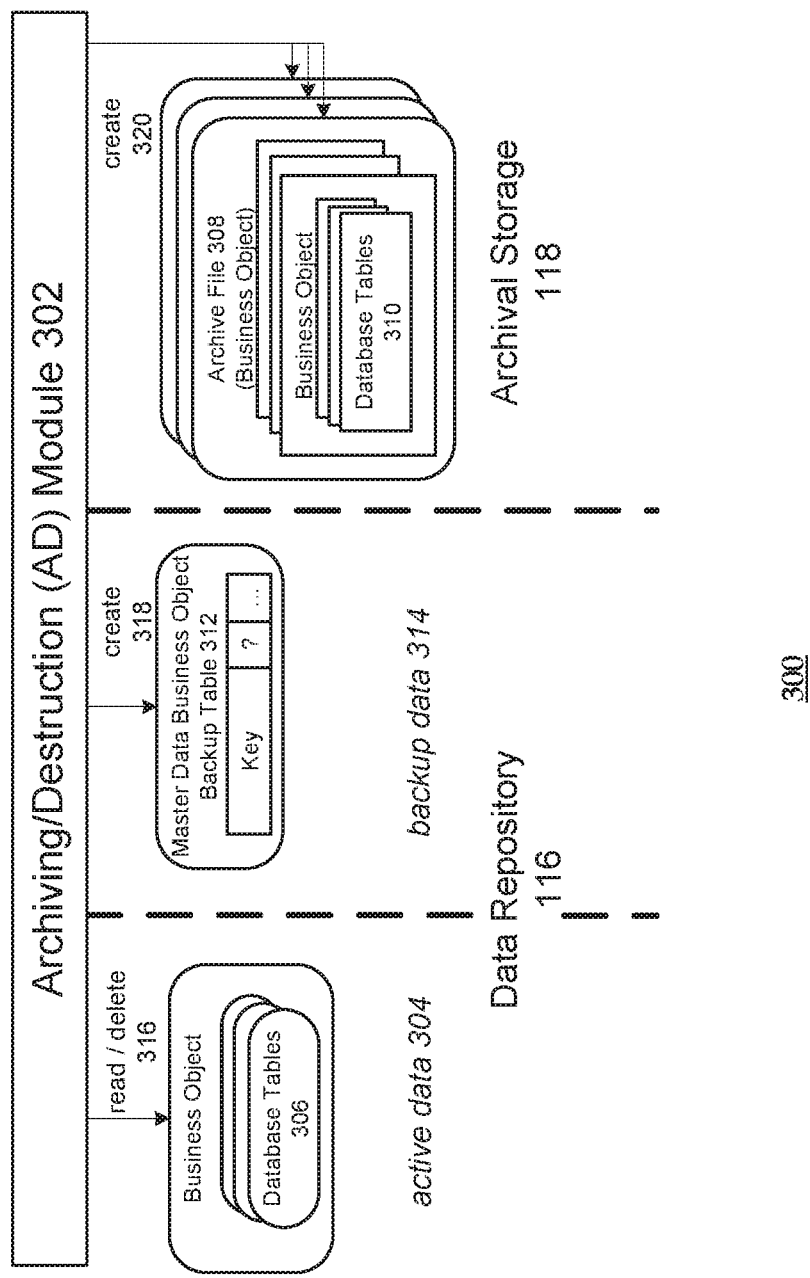
FIG. 3 is a block diagram illustrating operations on active data, backup data, and archived data.

FIG. 3 is a block diagram 300 illustrating operations on active data 304, backup data 314, and archival storage 118. Archiving/destruction (AD) module 302, which may implement one or more of backup table module 110, data object destruction module 112, and/or data object archiving module 114, interacts with different types of data stored in different tables on different storage devices. AD module 302 interacts with active data 304 stored as business objects in database tables 306, the database tables 306 being located in data repository 116. Master Data Business Object Backup Table (MDBOBT) 312 is stored in backup data 314, which is also stored in data repository 116. However, it is similarly contemplated that active data 304 and backup data 314 are stored in separate data repositories. Archive file 308, which as depicted represents a business object, is stored in database tables 310 in archival storage 118.

Figure 4:
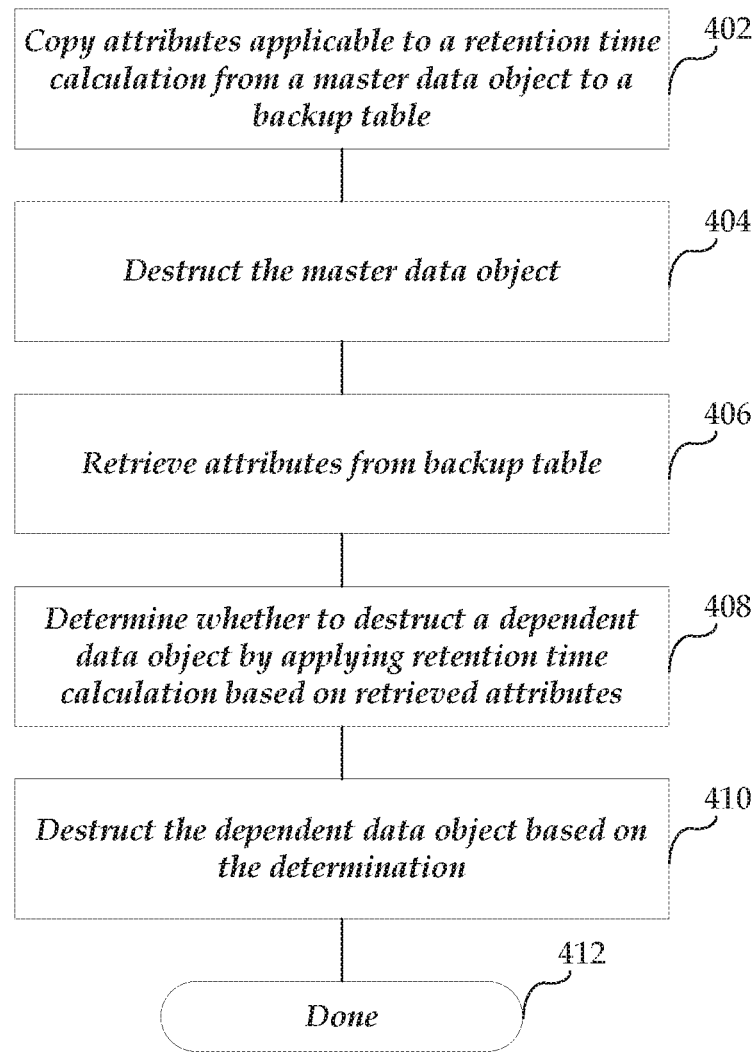
FIG. 4 is a flow chart illustrating an exemplary process of destructing interrelated data objects.

As discussed in more detail supra with regard to FIG. 4, AD module 302 reads and deletes 316 business objects from database tables 306. Business objects may be created upon the initiation of contract 204. Business objects may be destructed or archived in accordance with the process described with regard to FIG. 4. In one embodiment, once it is determined that a business object is to be destructed or archived, the business object is deleted from database tables 306. If the business object being deleted comprises a master business object, AD module 302 will first, or concurrently, create 318 an MDBOBT entry 312 to backup data 314 so that subsequent destructions/archival operations may utilize the attributes of the master business object. AD module 302 also creates 320 archive files containing business objects in database tables 310 of archival storage 118.

FIG. 4 is a flow chart illustrating an exemplary process 400 of destructing interrelated data objects. The process may be performed automatically or semi-automatically by the data object decoupling system 102, described above with reference to FIG. 1.

At block 402, one or more attributes from a master data object are copied to a backup table. For example, the master data object may represent a contract between a bank and a customer. In one embodiment, the attributes, such as the location or jurisdiction applicable to the contract, are stored in MDBOBT 312, using the same reference key used to identify the master data object. In one embodiment, the attributes stored are attributes usable in a retention time calculation for determining when an associated data object, such as a data object representing a payment on a bank account, is to be destructed. In another embodiment, the stored attributes are usable in a residence time calculation for determining when an active data object is to be archived.

At block 404, the master data object is destructed. In one embodiment, copying of attributes to backup data 314, as discussed above with regard to block 402, occurs in response to a request to destroy the master data object. However, it is also contemplated that backup data 314 serves as a store of attributes before the master data object is destructed.

In one embodiment, destructing the master data object comprises deleting a corresponding record from database tables 306 of data repository 116. However, any kind of backing store and corresponding object representation is similarly contemplated.

In one embodiment, destructing the master data object comprises archiving the master data object. Attributes relevant to the destruction of other data objects are copied from the archived master data object into the backup table, for use by dependent data objects. In this way, master data objects that were archived before the claimed embodiments were implemented on a given system can be used to apply retention time rules to archived data objects. This embodiment is particularly useful when regulations require data to be filtered and deleted retroactively.

At block 406, attributes are retrieved from backup data 314. In one embodiment, before attributes are retrieved from backup data 314, an attempt is made to retrieve the attributes from the corresponding master data object. In this way, the dependency of the data object on the master data object is decoupled. Typically, the reference identifier associated with the master data object is also used to query backup data 314.

At block 408, a determination is made whether to destruct the data object by applying a retention time calculation based on the one or more attributes retrieved in block 408. In one embodiment, a retention time calculation may include a rule that personal information (e.g., name, birthday, credit card number, etc.) must be deleted by end of business—i.e., when the holder of the information ceases to do business with the person. For example, if a contract between a landscaper and a customer expires on Jan. 1, 2016, it will be determined that the corresponding data object is to be deleted on Jan. 1, 2016.

A similar calculation may be performed to determine if a data object should be archived, based on a residence time rule and attributes retrieved from the backup table.

In one embodiment, a data object may be dependent on multiple master data objects. In these scenarios, attributes of each master data object are retrieved, either from the objects themselves or from backup data 314, and the appropriate retention time calculation is applied. If any of the retention time calculations indicate that the data object cannot be deleted yet—continuing the example of the contract between the landscaper and the customer, if it is not yet Jan. 1, 2016, then the object is not deleted. Once all of the retention time calculations indicate the data object is to be deleted, block 410 will be executed and the data object at issue destructed.

At block 410, the data object is destructed based on the determination made in block 408.

At block 412, the process 400 ends.

What is claimed is:

1. A computer-implemented method of destructing interrelated data objects, wherein the interrelated data objects include business objects, the method comprising:
   copying one or more attributes from a given master data object to a backup table, the given master data object defining a bank account, wherein the one or more attributes are applicable to a retention time calculation for determining when one or more dependent data objects are to be destroyed, a given dependent data object of the one or more dependent data objects defining a payment on the bank account, and wherein at least one of the one or more dependent data objects is dependent on a plurality of master data objects including the given master data object;
   destructing the given master data object;
   retrieving the one or more attributes from the backup table;
   subsequent to destructing the given master data object, determining whether to destruct one of the dependent data objects by applying the retention time calculation to the one of the dependent data objects and the retrieved one or more attributes, wherein the retention time calculation considers attributes, applicable to the retention time calculation for the at least one of the one or more dependent data objects dependent on the plurality of master data objects, having been copied from the plurality of master data objects to corresponding entries in the backup table; and
   destructing the one of the dependent data objects based on the determination whether to destruct the one of the dependent data objects.

2. The computer-implemented method of claim 1, wherein a master data object reference identifier is used as a reference identifier for a corresponding backup table entry.

3. The computer-implemented method of claim 1, wherein destructing the given master data object includes archiving the given master data object, and wherein a retention time rule for destruction includes a residence time rule for archiving.

4. The computer-implemented method of claim 1, wherein destructing the given master data object includes archiving the given master data object, the method further comprising:
   creating an entry in the backup table based on attributes of the archived given master data object; and
   re-applying the retention time calculation to an archived dependent data object.

5. The computer-implemented method of claim 1, wherein the given master data object is associated with an identifier, wherein the one or more attributes applicable to the retention time calculation are copied to an entry in the backup table associated with the identifier.

6. A computing apparatus facilitating destruction of interrelated data objects, the computing apparatus comprising:
a processor; and
a memory storing instructions that, when executed by the processor, configure the apparatus to:
copy one or more attributes from a given master data object to a backup table, wherein the one or more attributes are applicable to a retention time calculation for determining when one or more dependent data objects are to be destroyed, and wherein at least one of the one or more dependent data objects is dependent on a plurality of master data objects including the given master data object,
destruct the given master data object,
retrieve the one or more attributes from the backup table,
subsequent to destructing the given master data object, determine whether to destruct one of the dependent data objects by applying the retention time calculation to the one of the dependent data objects and the retrieved one or more attributes, wherein the retention time calculation considers attributes, applicable to the retention time calculation for the at least one of the one or more dependent data objects dependent on the plurality of master data objects, having been copied from the plurality of master data objects to corresponding entries in the backup table, and
destruct the one of the dependent data objects based on the determination whether to destruct the one of the dependent data objects.

7. The computing apparatus of claim 6, wherein a master data object reference identifier is used as a reference identifier for a corresponding backup table entry.

8. The computing apparatus of claim 6, wherein destructing the given master data object includes archiving the given master data object, and wherein a retention time rule for destruction includes a residence time rule for archiving.

9. The computing apparatus of claim 6, wherein destructing the given master data object includes archiving the given master data object, the memory further storing instructions that, when executed by the processor, further configure the apparatus to:
create an entry in the backup table based on attributes of the archived given master data object; and
re-apply the retention time calculation to an archived dependent data object.

10. A non-transitory computer-readable storage medium including instructions that when executed by a computer, causes the computer to:
copy one or more attributes from a given master data object to a backup table, wherein the one or more attributes are applicable to a retention time calculation for determining when one or more dependent data objects are to be destroyed, and wherein at least one of the one or more dependent data objects is dependent on a plurality of master data objects including the given master data object;
destruct the given master data object;
retrieve the one or more attributes from the backup table;
subsequent to destructing the given master data object, determine whether to destruct one of the dependent data objects by applying the retention time calculation to the one of the dependent data objects and the retrieved one or more attributes, wherein the retention time calculation considers attributes, applicable to the retention time calculation for the at least one of the one or more dependent data objects dependent on the plurality of master data objects, having been copied from the plurality of master data objects to corresponding entries in the backup table; and
destruct the one of the dependent data objects based on the determination whether to destruct the one of the dependent data objects.

11. The non-transitory computer-readable storage medium of claim 10, wherein the master data objects or the dependent data objects include business objects.

12. The non-transitory computer-readable storage medium of claim 11, wherein the given master data object defines a bank account, and a given dependent data objects of the one or more dependent data objects defines a transaction regarding the bank account.

13. The non-transitory computer-readable storage medium of claim 10, wherein the given master data object is associated with an identifier, wherein the one or more attributes applicable to the retention time calculation are copied to an entry in the backup table associated with the identifier.

14. The non-transitory computer-readable storage medium of claim 13, wherein the identifier is a Globally Unique Identifier (GUID).

15. The non-transitory computer-readable storage medium of claim 10, wherein the one or more attributes include a geographic location.

16. The non-transitory computer-readable storage medium of claim 10, wherein the retention time calculation determines whether to destruct the one of the dependent data objects based on a geographic location and an amount of time allowed after a last use of the one of the dependent data objects.

* * * * *